3,332,904
WATER-SOLUBLE INTERPOLYMERS OF ACRYLAMIDO-ALKYLSULFONATES

Edward M. La Combe, Charleston, and Walter P. Miller, St. Albans, W. Va., assignors to Union Carbide Corporation, a corporation of New York
No Drawing. Filed Oct. 2, 1963, Ser. No. 313,167
11 Claims. (Cl. 260—33.2)

ABSTRACT OF THE DISCLOSURE

Novel water-soluble interpolymers composed of about 8 to about 20 mole percent of an acrylamidoalkylsulfonate, about 65 to about 80 mole percent of acrylonitrile or methacrylonitrile, and about 10 to about 20 mole percent of an alkyl acrylate or methacrylate ester. Plasticized compositions of the aforesaid water-soluble interpolymers containing, as a plasticizer, about 10 to about 50 percent, based on the weight of the interpolymer, of glycerine or a polyoxyethylene glycol, suitable for preparation of clear, flexible, water-soluble films particularly useful as packaging materials for laundering additives such as detergents, bleaches, and the like.

---

The present invention is concerned with novel interpolymers, with plasticized interpolymer compositions thereof, and with films produced therefrom. More particularly, the invention is based upon the finding that acrylamidoalkylsulfonates can be interpolymerized with both acrylonitrile or methacrylonitrile and an alkyl acrylate or methacrylate ester to provide water-soluble interpolymers which are eminently suited for the production of films. The invention is especially concerned with the compositions obtained by admixture of the aforementioned interpolymers with a plasticizing amount of a suitable plasticizer. Such plasticized interpolymer compositions, it has been found, can be employed to produce clear, flexible, water-soluble films having attractive physical properties over a wide range of relative humidity.

The acrylamidoalkylsulfonates contemplated by this invention are known compounds and can be represented by the general formula:

$$CH_2=CRCONHCR^1R^2CH_2SO_3M$$

wherein R designates either hydrogen or methyl; $R^1$ and $R^2$, independently designate either hydrogen or alkyl of from 1 to about 8 carbon atoms, preferably from 1 to about 4 carbon atoms, and more preferably from 1 to 2 carbon atoms; and M designates an alkali metal, such as sodium, potassium or lithium, etc., or ammonium, ($-NH_4$) which, as known to the art, behaves like an alkali metal as a substituent. Suitable acrylamidoalkylsulfonates include, by way of illustration: sodium 2-acrylamido-2-methylpropanesulfonate, sodium 2-acrylamidoethanesulfonate, potassium 2-acrylamidopropanesulfonate, ammonium 2-methacrylamidopropanesulfonate, potassium 2-acrylamido-2-methylpropanesulfonate, ammonium 2-methacrylamido-2-methylpropanesulfonate, sodium 2-acrylamidohexanesulfonate, potassium 2-acrylamidodecanesulfonate, etc.

The acrylamidoalkylsulfonates can be obtained initially by the conventional reaction of acrylyl chloride or methacrylyl chloride with a saturated aliphatic hydrocarbon substituted by primary amine and sulfonic acid or sulfonate salt radicals, the latter being separated from the amine radical by at least 2 carbon atoms. Such process is described, for instance, in U.S. 2,983,712. The free sulfonic acid compounds can be converted to the corresponding sulfonates by reaction with a suitable basic compound, such as an ammonium- or alkali metal acetate, hydroxide, carbonate, or bicarbonate, etc., either prior to or during polymerization as hereinbelow described.

The interpolymers contemplated by this invention contain, in polymerized form and on a theoretical monomer basis, from about 8 to about 20 mole percent of the acrylamidoalkylsulfonate, from about 65 to about 80 mole percent of acrylonitrile or methacrylonitrile, and from about 10 to about 20 mole percent of an alkyl acrylate or methacrylate ester containing from 1 to about 8 carbon atoms, preferably from 1 to about 4 carbon atoms, and more preferably from 1 to 2 carbon atoms in the alkyl moiety of the ester radical, such as methyl acrylate, methyl methacrylate, ethyl acrylate, butyl acrylate, butyl methacrylate, hexyl acrylate, 2-ethylhexyl acrylate, n-octyl acrylate, n-octyl methacrylate, etc., including mixtures thereof. The interpolymerization of the monomers can be carried out by known polymerization techniques, preferably at a temperature of from about 25° C. to about 70° C., although in no way limited thereto. Thus, by way of illustration, bulk polymerization can be employed in which the monomers are mixed together with a polymerization catalyst and reacted at a temperature at which polymerization will occur. Emulsion and suspension polymerization processes can also be employed. These latter processes, as is known, are carried out in aqueous medium and generally employ free-radical-type polymerization catalysts, together with emulsifying or dispersing agents. Alternatively, solution polymerization can instead be used, in which case the monomers are dissolved in a suitable solvent and polymerized in contact with a polymerization catalyst.

The catalysts employed are the conventional polymerization catalysts known in the art, such as the alkali metal persulfates, the peroxides, the alkali metal bisulfites, azo compounds, such as azodiisobutyronitrile, and the like. When an emulsion or suspension polymerization is conducted, the emulsifying and dispersing agents which can be used include, for example, the common soaps, such as potassium stearate, potassium palmitate potassium laurate, etc.; the sulfonated hydrocarbons, such as sulfonated alkanes, sulfonated alkylbenzenes, sulfonated naphthalenes, etc.; the amine soaps, such as the salts of triethanolamine; the salts of formaldehyde-condensed alkyl-aryl sulfonic acids; sulfonated succinic esters; and the like. Alternatively, in connection with solution polymerization, suitable solvents include, for example, acetone, acetonitrile, N,N-dimethylformamide, N,N-dimethylacetamide, dimethyl sulfoxide, and the like. In some instances, the presence of a small amount of water or acid may also be desirable to aid solution. Moreover, up to about one percent or more of a chain terminator, as for instance, tertiary dodecyl mercaptan, 2-mercaptoethanol, thiourea, or the like, can also be added to the polymerization reaction mixture, if desired, to assist in regulating the molecular weight of the resulting polymer.

The monomers are best charged in proportions approximating those desired in the polymer product, substantially complete conversion being realized. A constant ratio of the monomers is preferably maintained in the reaction mixture by the intermittent addition of the various monomers as needed to achieve polymer uniformity. After the polymerization is completed, the interpolymer is recovered and dried by conventional procedures. Either before or after recovery, one can add pigmenting agents, light stabilizers, heat stabilizers, oxidation inhibitors, etc., to the interpolymer.

When the amido-containing monomer charged is a free sulfonic acid rather than a sulfonate, a basic compound of the type described above in connection with the production of the sulfonate monomer can be incorporated in the polymerization mixture in an amount sufficient to convert essentially all of the free sulfonic acid to the corresponding alkali metal sulfonate. Alternatively, the interpolymer product containing free sulfonic acid groups can subsequently be reacted with the basic compound in similar manner.

Moreover, for subsequent use in the production of films, it is desirable that the interpolymers of this invention be of sufficiently high molecular weight. Suitable interpolymers, it has been found, are those having a molecular weight corresponding to a reduced viscosity of at least about 0.5 as measured from a solution containing 0.2 gram of interpolymer in 100 ml. of dimethylformamide at a temperature of 20° C. Interpolymers having a lower reduced viscosity, and consequently a lower molecular weight, form films which are generally excessively brittle and weak or fragile. The preferred interpolymers of this invention are those having a reduced viscosity of from about 1.5 to about 2.0. The molecular weight of the interpolymer can be controlled to within the range desired in any convenient manner such as by the choice of polymerization technique, solvent, chain-terminating agent, etc.

The interpolymers produced as described above are ordinarily obtained as water-soluble solids which are readily converted or ground into free-flowing powders, and can be employed as thickeners, dispersing agents, antistatic agents, textile sizes, etc. The interpolymers are particularly well suited for the production of tough and flexible films, and to this end are preferably admixed with a plasticizing amount of one or more suitable plasticizers such as glycerine or a high molecular weight polyoxyalkylene glycol having an average molecular weight of from about 600 to about 4,000 or higher, preferably a polyoxyethylene glycol.

The amount of plasticizer employed can vary broadly, but is generally maintained in the range of from about 10 to about 50 percent by weight, and preferably from about 15 to about 35 percent by weight, based upon the weight of interpolymer. Proportions of substantially less than about 10 percent by weight of plasticizer are ordinarily insufficient to overcome the somewhat brittle and fragile characteristics of the unplasticized polymer. Proportions substantially in excess of 50 percent by weight of plasticizer, on the other hand, may yield films which are excessively soft and tacky, and of low strength.

Films of the plasticized polymer composition can be prepared in any convenient manner. For instance, mixtures of the interpolymer and plasticizer can be milled or molded at suitably elevated temperatures and pressures. Alternatively, films can be cast or sprayed from hot aqueous solutions, preferably containing from about 5 to about 50 percent by weight of the plasticized interpolymer, and dried. The films thus formed are clear, non-tacky, heat-sealable, tough and flexible. When introduced into water at room temperature, the films swell readily and in a short period of time are soft and easily disintegrated. At a temperature of about 60° C., or higher, the films are completely soluble in water. Possessing such physical properties, films produced from the plasticized polymer compositions of this invention, are well adapted to use as packaging material for bleaches, detergents and other laundering additives, etc. In addition to the preparation of films, the plasticized interpolymer compositions of this invention can be employed in any of the other uses for the interpolymers as described above.

The invention is illustrated further by the following specific examples, but is in no way limited thereto.

*Example I*

A glass polymerization bottle was purged with nitrogen and subsequently charged with 41 grams of 2-acrylamido-2-methyl-propanesulfonic acid (93 percent pure, containing 7 percent acetic acid), 12.8 grams of sodium acetate, 110 grams of acetone, 57.6 grams of acetic acid, 60 grams of acrylonitrile, 24 grams of ethyl acrylate, and 0.5 gram of azobisisobutyronitrile. The bottle was again purged with nitrogen, capped, and tumbled in a rotating water bath at a temperature of 60° C. for a period of 17 hours. A terpolymer was formed. The polymer was precipitated with isopropanol, recovered by filtration, washed with isopropanol, and dried for a period of 48 hours at a temperature of 80–90° C. in a forced air oven. The polymer was then ground into a free-flowing easily-handled powder using an osterizer. There were thus obtained 97 grams of a terpolymer containing, in polymerized form and on a theoretical monomer basis, approximately 11.8 mole percent of sodium 2-acrylamido-2-methylpropanesulfonate, 72.7 mole percent of acrylonitrile and 15.4 mole percent of ethyl acrylate. Analysis indicated that the polymer contained approximately 12.54 percent by weight of nitrogen and 5.12 percent by weight of sulfur, and had a reduced viscosity of 1.75, determined as described above. The polymer was also found to be completely water soluble at a temperature of 60° C.

*Example II*

In this series of experiments, tabulated below as runs A to E, casting solutions were prepared by mixing 10 grams of the terpolymer product of Example I with 40 grams of distilled water and adding one or more plasticizers to the mixture in a proportion of 25 percent by weight based upon the weight of the terpolymer. In run A, the plasticizer employed was a polyoxyethylene glycol having an average molecular weight of 600; in run B, the plasticizer employed was a polyoxyethylene glycol having an average molecular weight of 4,000; in run C, the plasticizer employed was glycerine; and in run D, the plasticizer employed was an equal weight mixture of glycerine and the plasticizer of run B (i.e., 12.5 percent by weight of each). A control run was also conducted, run E, in which no plasticizer was employed. The resulting mixtures were solvated by heating to a temperature of 75° C. until solution was complete, and films were cast from the solutions onto glass plates using a 0.025 inch casting knife. The films were then dried, initially at a temperature of 95° C. for a period of 3 hrs. and thereafter at a temperature of 110° C. for a period of 1 hr. in a forced air oven. The films thus obtained from the plasticized polymer compositions, runs A to D, were in most instances, clear, flexible, and tough, while the film obtained from the unplasticized polymer (run E) was clear and somewhat brittle and fragile. The properties of the films were determined at various relative humidities using an Instron tensile tester as follows: film strips of equal premeasured thickness were placed between the jaws of the tester and stretched under a constant rate of 1000 percent/min. The force (p.s.i.) and elongation (percent) were recorded automatically and the values at the breaking point are tabulated below.

The stiffness (p.s.i.) was calculated from the stress/strain ratio using the initial 10% of the recorded curve.

| Run | Tensile Strength (p.s.i.) | | | Elongation (Percent) | | | Stiffness (p.s.i.), 70% RH |
|---|---|---|---|---|---|---|---|
| | 70% RH | 95% RH | 9% RH | 70% RH | 95% RH | 9% RH | |
| A | 989 | 274 | | 149 | 49 | | 1,803 |
| B | 1,487 | 444 | | 89 | 141 | | 4,530 |
| C | 1,303 | 472 | 1,174 | 135 | 86 | 52 | 5,089 |
| D | 1,135 | 509 | 1,213 | 201 | 358 | 91 | 2,488 |

In the table, blank spaces indicate that no measurement was made under the conditions specified. The film obtained from the unplasticized polymer (run E) was too brittle to be evaluated by the aforementioned procedures.

Similar films are obtained by substituting an equal amount of the interpolymer containing, in polymerized form and on a theoretical monomer basis, approximately 15 mole percent of potassium 2-methacrylamidoethanesulfonate, 70 mole percent of acrylonitrile, and 15 mole percent of ethyl methacrylate for the interpolymer of this example, such interpolymer being obtained by the interpolymerization of the indicated proportions of monomers substantially described above in Example I. In like manner, similar films are also obtained by substituting an equal amount of the interpolymer containing, in polymerized form and on a theoretical monomer basis, approximately 10 mole percent of ammonium 2-acrylamidohexane sulfonate, 80 mole percent of methacrylonitrile, and 10 mole percent of butyl acrylate for the interpolymer of this example, such interpolymer being obtained by the interpolymerization of the indicated proportions of monomers substantially as described above in Example I.

What is claimed is:

1. The interpolymer composed, in polymerized form and on a theoretical monomer basis, of (a) from about 8 to about 20 mole percent of an acrylamidoalkylsulfonate of the formula:

$$CH_2=CRCONHCR^1R^2CH_2SO_3M$$

wherein R is selected from the group consisting of hydrogen and methyl, $R^1$ and $R^2$ are selected from the group consisting of hydrogen and alkyl of from 1 to 4 carbon atoms, and M is selected from the group consisting of alkali metal and ammonium, (b) from about 65 to about 80 mole percent of a compound selected from the group consisting of acrylonitrile and methacrylonitrile, and (c) from about 10 to about 20 mole percent of a compound selected from the group consisting of the alkyl acrylate and methacrylate esters containing from 1 to 8 carbon atoms in the alkyl moiety of the ester radical thereof, said interpolymer having a reduced viscosity of at least about 0.5.

2. The interpolymer composed, in polymerized form and on a theoretical monomer basis, of (a) from about 8 to about 20 mole percent of sodium 2-acrylamido-2-methylpropanesulfonate, (b) from about 65 to about 80 mole percent of acrylonitrile, and (c) from about 10 to about 20 mole percent of ethyl acrylate, said interpolymer having a reduced viscosity of at least about 0.5.

3. The interpolymer composed, in polymerized form and on a theoretical monomer basis, of (a) from about 8 to about 20 mole percent of potassium 2-methacrylamidoethanesulfonate, (b) from about 65 to about 80 mole percent of acrylonitrile, and (c) from about 10 to about 20 mole percent of ethyl methacrylate, said interpolymer having a reduced viscosity of at least about 0.5.

4. The interpolymer composed, in polymerized form and on a theoretical monomer basis, of (a) from about 8 to about 20 mole percent of ammonium 2-acrylamidohexanesulfonate, (b) from about 65 to about 80 mole percent of methacrylonitrile, and (c) from about 10 to about 20 mole percent of butyl acrylate, said interpolymer having a reduced viscosity of at least about 0.5.

5. The plasticized composition comprising an interpolymer composed, in polymerized form and on a theoretical monomer basis, of (a) from about 8 to about 20 mole percent of an acrylamidoalkylsulfonate of the formula:

$$CH_2=CRCONHCR^1R^2CH_2SO_3M$$

wherein R is selected from the group consisting of hydrogen and methyl, $R^1$ and $R^2$ are selected from the group consisting of hydrogen and alkyl of from 1 to 4 carbon atoms, and M is selected from the group consisting of alkali metal ammonium, (b) from about 65 to about 80 mole percent of a compound selected from the group consisting of acrylonitrile and methacrylonitrile, and (c) from about 10 to about 20 mole percent of a compound selected from the group consisting of the alkyl acrylate and methacrylate esters containing from 1 to 8 carbon atoms in the alkyl moiety of the ester radical thereof, said interpolymer having a reduced viscosity of at least about 0.5; and from about 10 to about 50 weight percent based upon the weight of said interpolymer of a plasticizer selected from the group consisting of glycerine and the polyoxyethylene glycols having an average molecular weight of from about 600 to about 4,000.

6. The plasticized composition of claim 5 wherein said plasticizer is glycerine.

7. The plasticized composition of claim 5 wherein said plasticizer is a polyoxyethylene glycol having an average molecular weight of from about 600 to about 4,000.

8. The plasticized composition comprising an interpolymer composed, in polymerized form and on a theoretical monomer basis, of (a) from about 8 to about 20 mole percent of sodium 2-acrylamido-2-methylpropanesulfonate, (b) from about 65 to about 80 mole percent of acrylonitrile, and (c) from about 10 to about 20 mole percent of ethyl acrylate, said interpolymer having a reduced viscosity of at least about 0.5; and from about 15 to about 35 weight percent based upon the weight of said interpolymer of a plasticizer selected from the group consisting of glycerine and the polyoxyethylene glycols having an average molecular weight of from about 600 to about 4,000.

9. The plasticized composition comprising an interpolymer composed, in polymerized form and on a theoretical monomer basis, of (a) from about 8 to about 20 mole percent of ammonium 2-acrylamidohexanesulfonate, (b) from about 65 to about 80 mole percent of methacrylonitrile, and (c) from about 10 to about 20 mole percent of butyl acrylate, said interpolymer having a reduced viscosity of at least about 0.5; and from about 15 to about 35 weight percent based upon the weight of said interpolymer of a plasticizer selected from the group consisting of glycerine and the polyoxyethylene glycols having an average molecular weight of from about 600 to about 4,000.

10. The plasticized composition comprising an interpolymer composed, in polymerized form and on a theoretical monomer basis, of (a) from about 8 to about 20 mole percent of ammonium 2-acrylamidohexanesulfonate, (b) from about 65 to about 80 mole percent of methacrylonitrile, and (c) from about 10 to about 20 mole percent of butyl acrylate, said interpolymer having a reduced viscosity of at least about 0.5; and from about 15 to about 35 weight percent based upon the weight of said interpolymer of a plasticizer selected from the group consisting of glycerine and the polyoxyethylene glycols having an average molecular weight of from about 600 to about 4,000.

11. The plasticized composition of claim 5 in film form.

References Cited
UNITED STATES PATENTS

| | | | |
|---|---|---|---|
| 2,585,499 | 2/1952 | Rothrock | 260—33.4 |
| 2,983,712 | 5/1961 | Wilkinson | 260—79.3 |
| 3,220,917 | 11/1965 | Lowes | 260—33.2 |

MORRIS LIEBMAN, *Primary Examiner.*

J. FROME, *Assistant Examiner.*